United States Patent [19]

Lundin

[11] Patent Number: 4,834,880
[45] Date of Patent: May 30, 1989

[54] DEVICE FOR PICKING UP OIL FROM WATER AND FROM THE SURFACE OF WATER

[75] Inventor: Lars Lundin, Porvoo, Finland

[73] Assignee: Oy Lars Lundin Patent AB, Finland

[21] Appl. No.: 24,918

[22] Filed: Mar. 13, 1987

Related U.S. Application Data

[63] Continuation of Ser. No. 617,379, Jun. 5, 1984, abandoned.

[30] Foreign Application Priority Data

Jun. 9, 1983 [FI] Finland ................................. 832079

[51] Int. Cl.⁴ ............................................. B01D 15/02
[52] U.S. Cl. ................................. 210/242.3; 198/643; 210/242.1; 210/242.2; 210/776; 210/923; 210/924
[58] Field of Search ..................... 210/923, 924, 242.3, 210/242.1, 242.2, 776; 15/51; 198/643

[56] References Cited

U.S. PATENT DOCUMENTS

| | | | |
|---|---|---|---|
| 582,509 | 5/1897 | Seufert | 15/51 |
| 3,314,540 | 4/1967 | Lane | 210/923 |
| 3,403,098 | 9/1968 | Hirs | 210/923 |
| 3,903,561 | 9/1975 | McCaslin | 15/40 |
| 3,968,401 | 6/1976 | De Voss | 210/242.2 |
| 4,138,340 | 2/1979 | Suzuki et al. | 210/923 |

Primary Examiner—Asok Pal

[57] ABSTRACT

The invention relates to a device for picking up oil from water and from the surface of water, the device being installed to a water craft and comprising at least one collecting means passing around rolls and being installed obliquely, there being at the upper end of the collecting means devices for removing the oil collected by the collecting means and for directing it into a tank in the water craft. The object is especially to eliminate the disadvantages of previously known devices of the mat type that, when the craft moves, the mat tends to direct water and, along with it, also oil to the sides, past the mat. In accordance with the invention the device comprises a number of parallel loop-like collecting means, each of which is made up of pieces provided with upwards and sidewards extending bristles and fixed to the chain, the sidewards-directed bristles extending sufficiently far to come into contact with each other, but allowing water to flow without hindrance through the device.

2 Claims, 1 Drawing Sheet

DEVICE FOR PICKING UP OIL FROM WATER AND FROM THE SURFACE OF WATER

This application is a continuation of application Ser No. 617,379, filed June 5, 1984, now abandoned.

BACKGROUND OF THE INVENTION 1. 1. Field of the Invention The present invention relates to a device for picking up oil from water and from the surface of water, preferably of the type which is adapted to be installed in a water craft and comprises at least one oblong collecting means passing over rolls or rollers, the collecting means having been fitted obliquely downwards and forwards in relation to the water craft travel direction, means having been arranged at the upper end of the collecting means for removing the oil collected by it and for directing the oil into a tank in the craft.

2. Description of the Prior Art It is previously known to use rotatable mats extending obliquely to the water for collecting and removing oil which is on the surface of water. There are known mats which are provided with transverse strips of wood or similar means for picking up oil, as well as with threads or other similar oil-absorbing means attached to the uninterrupted mat surface (e.g. U.S. Pat. No. 3,617,555). It has been shown that, especially when the oil is deeper in the water, the efficiency of these known devices is very low. Even at very low speeds of the craft, even at one knot, the mat easily directs the water, and along with it also the oil, to the sides so that the quantity of oil obtained in the mat remains rather small. From, for example, U.S. Pat. No. 226,662 it is also known to use plastic belts having a circular cross section and running in parallel, but it is evident that the oil-collecting capacity of such belts is very low.

SUMMARY OF THE INVENTION

The object of the present invention is to eliminate those problems involved in the previously known devices by simple means and to provide an oil-collecting device which is capable of efficiently collecting and picking up oil from the surface of water, as well as from deeper down. In order to achieve this object the collecting means is made up of a loop made from a chain or the like, to which there are fixed successive pieces provided with bristles, the bristles extending, as seen in the longitudinal direction of the clain, upwards and to both sides. The device comprises several such collecting means arranged in parallel, the rolls at each end of the means being mounted on a common shaft and the mutual distances between the means having been selected so that the bristles of adjacent collecting means, extending sidewards, substantially extend as far as to contact each other but allow the flow of water between the collecting means. The essential characteristic of the invention is thus that the device has been arranged so as to be highly permeable to water, so that when the water craft travels forwards, water can substantially without obstacle flow between the collecting means, the oil adhering to the bristles of the collecting means at the same time as the water passes between them. Advantageously, individual bristled pieces can, by using ordinary chains available commercially, be fastened to the chain, for example by means of bolts passing through sleeves transverse to the chain.

DESCRIPTION OF THE PREFERRED EMBODIMENT

Figure 1:
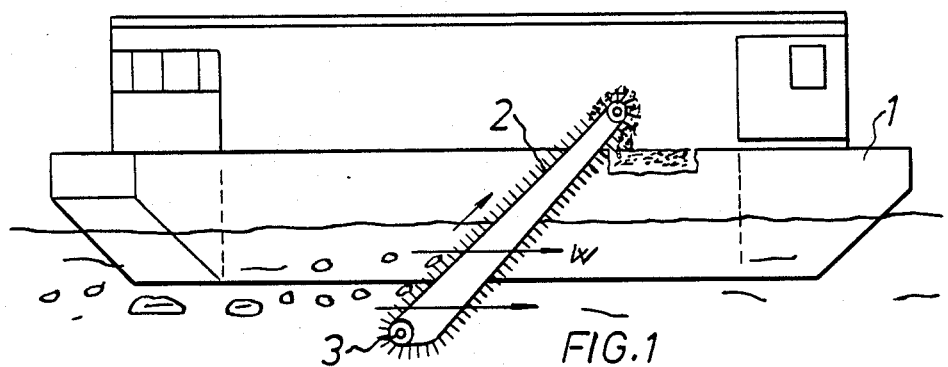
FIG. 1 is a schematic representation of a water craft equipped with an oil-collecting device according to the invention.

FIG. 1 shows how an arrangement 2, described below in greater detail, running around rolls 3, is fitted to the water craft 1 in such a way that it extends obliquely down to the water. The craft travels slowly, from right to left in the figure, the flow of water being indicated by arrows W. The rotating arrangement picks up oil from the surface of water, as well as from deeper down, and at the top end of the arrangement there are provided in a known manner oil-removal means, not shown here, which direct the oil collected from the mat into a tank in the craft. The oil-removal means can be, for example, of the type described in EP application No. 84302187.4.

The straight part of the arrangement can be, for example, 5–10 meters long, in which case it may also extend several meters into the water. The essential idea of the invention is that water can flow well through the arrangement, in which case also its oil-collecting efficiency is excellent.

Figure 2:
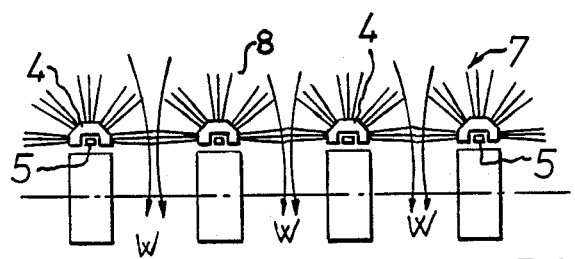
FIG. 2 is a schematic representation of an end view of a mat according to the invention.

FIG. 2 depicts schematically an end view of the arrangement. It is made up of loop-like collecting means 7 arranged in parallel, only their upper part being shown in the figure. Each collecting means for its part is made up of individual bristled pieces 4, which have been attached successively by means of longitudinal chains to form a row, the chains passing around wheels 3 at the ends of the arrangement. As shown in the figure, the space in the lateral direction between the bristle-supporting members 4 is greater than the width of the body of the pieces, and the bristles 8 on adjacent pieces 4 extend in the lateral direction so as to come into contact with each other. When the craft and the arrangement move, oil adheres to the bristles 8 on the pieces 4, but water can easily flow between the bristles, in which case the oil to be collected is not directed to the sides. The interval between the rows can be, for example, 25 cm and the height of a bristled piece 4, including its bristles, in the order of 15 cm.

Figure 3:
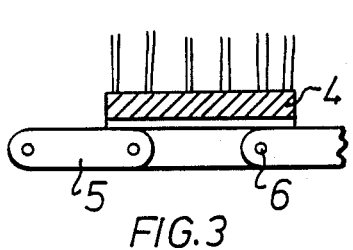
FIG. 3 depicts a side view, in part in section, of the chain and the bristled pieces attached to it.
Figure 4:
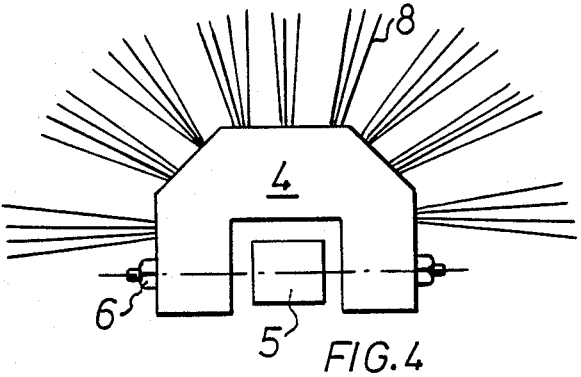
FIG. 4 depicts an end view of a bristled piece.

FIGS. 3 and 4 show schematically the attachment of an individual bristled piece to be chain. The bristled piece 4 is preferably made of strong plastic, as are the bristles fixed to it. As is shown in FIG. 4, the cross section of the bristled piece 4 has substantially the shape of an upside-down U, the steel chain 5 having been fitted to pass between the branches of the U. The chain can be of any type available commercially, most preferably one in which the articulation pins are in the form of sleeves, in which case the bristled piece 4 can be secured to the chain by means of a bolt 6 or a pin, passing through the articulation sleeve.

It is evident that the device can be implemented in several different ways within the scope of the invention and in manners deviating from that shown in the drawing, as long as care is taken that water can flow easily between the bristled pieces which form the collecting surface. The dimensions mentioned above are also intended only to illustrate the example, and the device is, of course, in practice dimensioned according to its application.

What is claimed is:

1. A device for picking up oil from water and from the surface of water adapted to be installed on a water craft, said device comprising:

a plurality of oblong loop shaped collecting members havings ends, arranged in parallel and obliquely downwards, with one end of each member in the water and the other end of each member at a higher position above the water level, said collecting members being spaced apart in a direction transverse to the direction of water movement past the water craft;

two common axes extending transversely at the lower and upper end of the collecting members, respectively;

roller means, provided on said axes to facilitate the loop shaped collecting members to run therearound;

each of said loop shaped collecting members comprising a chain loop of successive chain links and a plurality of collecting means attached to the chain links, each of said collecting means comprising a body provided with bristles and being fixed on said chain links in a successive manner to form a successive line of bristles thereon, said bristles extending upwardly and to both sides of said chain loop, the lateral spacing between adjacent bodies on adjacent collecting members, not including the bristles, being at least equal to the width of the bodies carrying said bristles, and the bristles on the bodies of adjacent collecting members extending into contact with each other over said lateral spacing; and means provided at the upper end of said collecting members for removing oil from said collecting members and for conducting said oil into a collecting tank.

2. A device according to claim 1, wherein said body has a cross-section having substantially the shape of an upside-down U having branches, said chain loop being disposed to pass between the branches of the U and being secured thereto by means of bolts passing through said chain loop.

* * * * *